Feb. 7, 1967     I. C. JENNINGS     3,302,575

CONTROL FOR SEWAGE EJECTORS AND SUMP PUMPS

Filed Dec. 11, 1964     3 Sheets-Sheet 1

*INVENTOR.*
IRVING C. JENNINGS

BY *Nolte & Nolte*

ATTORNEYS

Feb. 7, 1967     I. C. JENNINGS     3,302,575
CONTROL FOR SEWAGE EJECTORS AND SUMP PUMPS
Filed Dec. 11, 1964     3 Sheets-Sheet 3

INVENTOR.
IRVING C. JENNINGS

BY

ATTORNEYS

United States Patent Office 3,302,575
Patented Feb. 7, 1967

3,302,575
CONTROL FOR SEWAGE EJECTORS AND
SUMP PUMPS
Irving Callender Jennings, % Nash Engineering Co.,
South Norwalk, Conn. 06854
Filed Dec. 11, 1964, Ser. No. 417,616
7 Claims. (Cl. 103—26)

This invention relates to sewage and industrial waste disposal, and more generally to all sorts of sump pumping.

Industrial waste and sewage are collected, usually by gravity flow, in pots or tanks, whence it must be lifted to service sewers. The tank is ordinarily below the source of waste, and consequently is often preferably buried in the ground.

The tank is permitted to fill by the influx of waste liquid until the surface of the liquid reaches a predetermined level. At that point, a pump is activated, and runs until the tank is nearly empty, when it is shut off. In previous constructions the operation of the pump has been controlled by a float in the collecting tank or pot. Because of entrained solids, the float sometimes becomes so loaded with solids that it will not rise, or the parts of the float mechanism exposed to the waste in the tank become fouled to such an extent that the mechanism does not operate correctly. The tank must then be opened, and the mechanism put in order, which is a dirty, expensive procedure, and furthermore may necessitate the provision of headroom over the tank, which increases the cost of original installation. Obviously, it would be advantageous to be able to install a tank or pot, buried if necessary, which could be made of suitably corrosion resistant material, requiring no more maintainance than any component of a sewage piping system, which does not contain any mechanism likely to get out of order because of the corrosive effects of the material handled or its entrained solids. It is with the attainment of this objective that this invention is chiefly concerned.

In view of the above considerations it is a primary object of the present invention to provide a waste disposal system which does not require a float or float operated mechanism in the tank, pot or sump serving as the collection point for such waste.

It is a further object of the present invention to provide a device which responds to the rise of the surface of a liquid in a tank to initiate the operation of a pump for emptying the tank which is also responsive to the lowering of the liquid in the tank below a predetermined level to shut off the pump without requiring the device to measure the level of the liquid in the tank directly.

Further objects and advantages will become evident in the appended specification and drawings in which.

Figure 1:
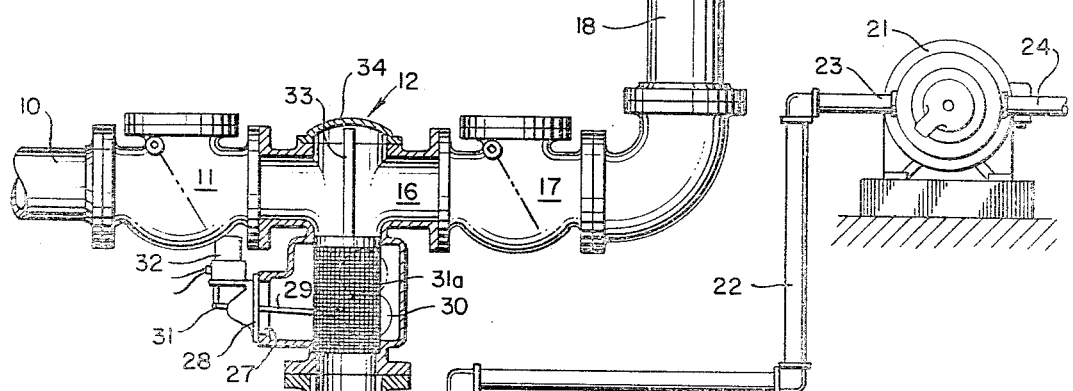
FIG. 1 is an elevation partly in section and partly diagrammatic of one preferred embodiment of the present invention.
Figure 2:
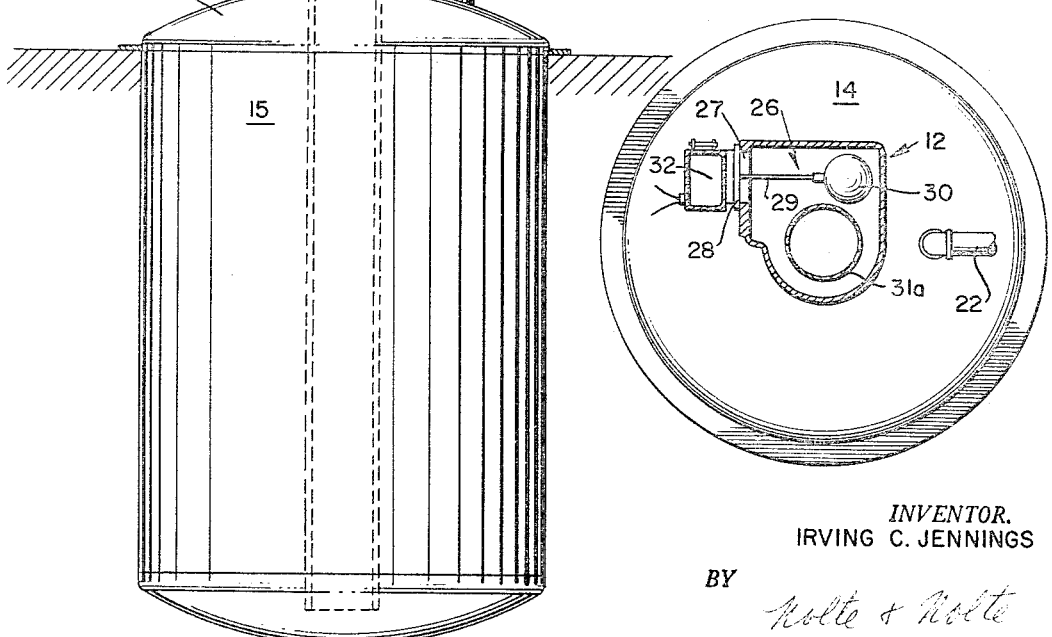
FIG. 2 is a plan sectional view taken on line 2—2 of FIG. 1.

In the embodiment shown in FIGS. 1 and 2, the waste fluid is delivered by gravity or otherwise by the pipe line 10. A check valve 11 permits passage to the special T casting 12, the downward extending branch of which is connected to a pipe 13, which in turn passes through the cover 14 of the tank 15, which may be buried in the ground. The pipe 13 extends to a point near the bottom of the tank 15, for a reason to become apparent. The other horizontal branch 16 of the special T casting is in turn connected through a check valve 17 to a line 18 extending to a sewer elevated above the structure shown.

It can be seen that waste fluid from the line 10 will pass through the T and fall into the tank 15, provided the tank 15 is vented.

It is intended that the waste material is to flow down the line 10, through the valve 11, the T 12 and the pipe 13 into the tank 15. When the tank 15 is filled to a predetermined level, the waste material is to be driven up pipe 13, through the T casting 12, and through the branch 16 thereof and the check valve 17 to the line 18 which discharges into a sewer.

For the purpose of venting the tank and driving the waste fluid up the pipe 13, a line 22 is connected through the top 14 of the tank 15 to the interior thereof. This line 22 is connected to a compressor 21, for the purpose of supplying air to the tank 15 when it is desired to empty it. A particularly advantageous type of compressor for this service is that shown in U.S. Patent 1,492,171. That type of compressor, by its inherent construction, permits passage of air from its outlet 23 to its inlet 24, and vice versa, when it is standing idle. When such a compressor is used, the line 22 thus serves as a vent for the tank 15 during the filling part of the cycle. Any air compressor, however, may be used, if means is provided to vent the tank 22 when the compressor is standing idle, with additional means to close the vent when the compressor starts. With those compressors which do not do this inherently or automatically, a solenoid operated vent valve in the vent line, closing when the compressor starts, is a convenient expedient.

With the liquid ring type of compressor shown, it is not ordinarily contemplated that the sewage enter the pump, and any conventional supply of water for the liquid ring required may be supplied.

For the purpose of causing operation of the pump 21 when the fluid reaches a suitable level, a float mechanism is provided within the T casting. The casting has a chamber 26, as shown in FIG. 2, within which the float is supported to rise and fall in accordance with the level of the liquid in the chamber. The actual mechanism is unimportant, but the shown one has the advantage of simplicity and ease of access for maintenance. An opening 27 is provided in the chamber, to which is secured a cover 28. A float arm 29 is pivotally connected to the cover 28, so that the float 30 is free to move between the positions shown in FIG. 1. The arm 29 is preferably secured to a shaft passing to the exterior of the cover, with suitable watertight bearing means. The exterior end of the shaft has secured to it a crank arm 31, connected to an electric switch 32. Rise of the float activates the motor of the pump 21, and fall shuts it off.

For the purpose of protecting the float, it is preferable that a screen 31a be installed, passing from top to bottom of the chamber 26. This screen may be provided with a bale 33 for removal through the opening at the top of the casting upon removal of the blind flange 34.

The operation of the device should now be clear. Liquid waste entering the check valve 11 flows into the T casting and flows down pipe 13 to the tank, which, being vented through pipe 22 and compressor 21 fills. This continues until the liquid rises high enough in the fitting to raise the float 30, activating the compressor motor. The compressor starts, and any liquid in the vent line 22 is discharged into the tank, and the pump then discharges air into the tank 15. The air pressure raises the liquid through the pipe 13, past the screen 31a, and into the upper part of the T, when it discharges through the check valve 17 to the line 18 to the sewer or other point of disposal. When the level of the liquid within the tank falls below the bottom of the pipe 13, the liquid in the pipe 13 falls back into the tank 15, emptying the chamber 26. As a result, the float 30 drops, shutting off the compressor motor.

It will be noted that there is no flow into the chamber 26 through the meshes of the screen except for the trifling amount necessary to fill the chamber. As the main flow is up and down the interior of the screen, the screen tends to keep clean. Furthermore, any slight amount of entained solids which might enter the chamber through the screen meshes has a tendency to be removed by the rushing out of the liquid in a downward direction when the water seal at the bottom of the pipe 13 is broken.

Figure 3:
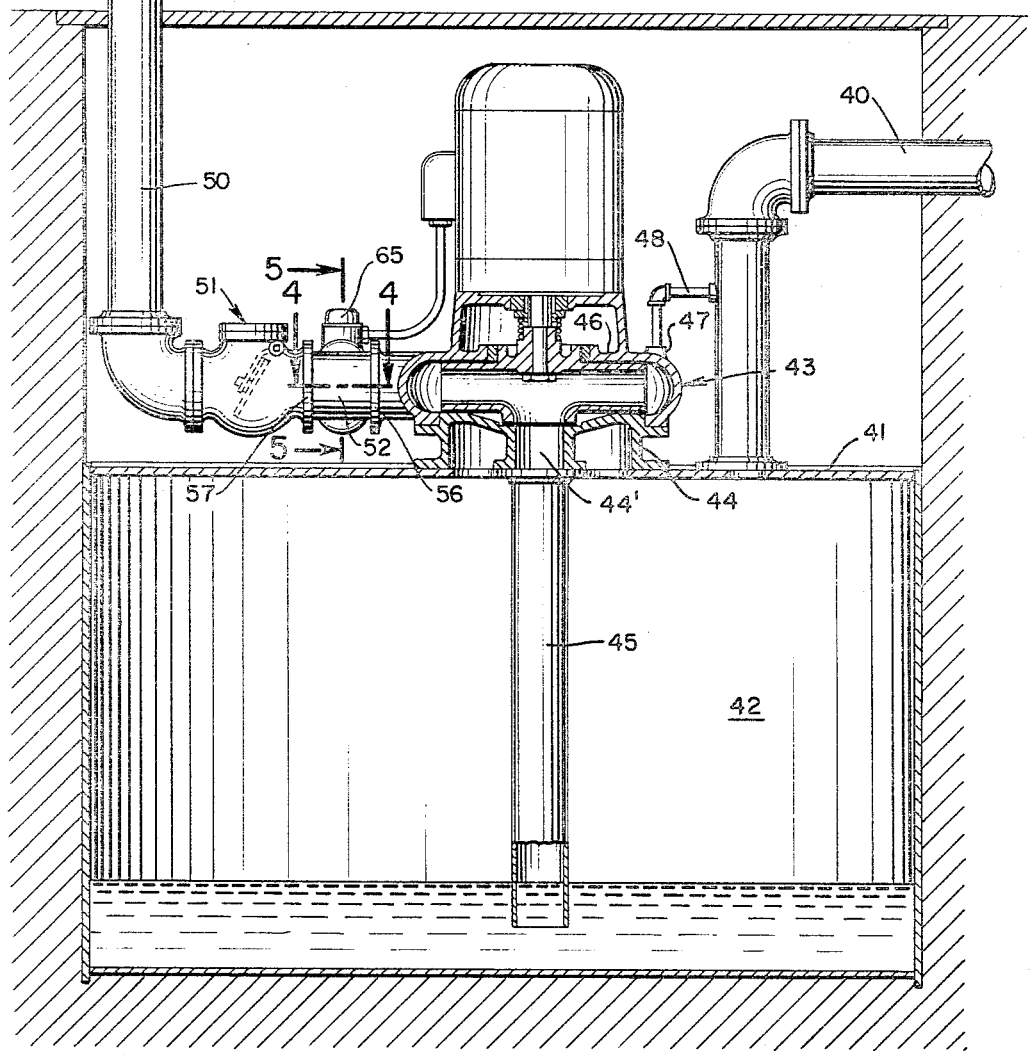
FIG. 3 is an elevation, partly in section, of another preferred embodiment of the present invention.
Figure 4:
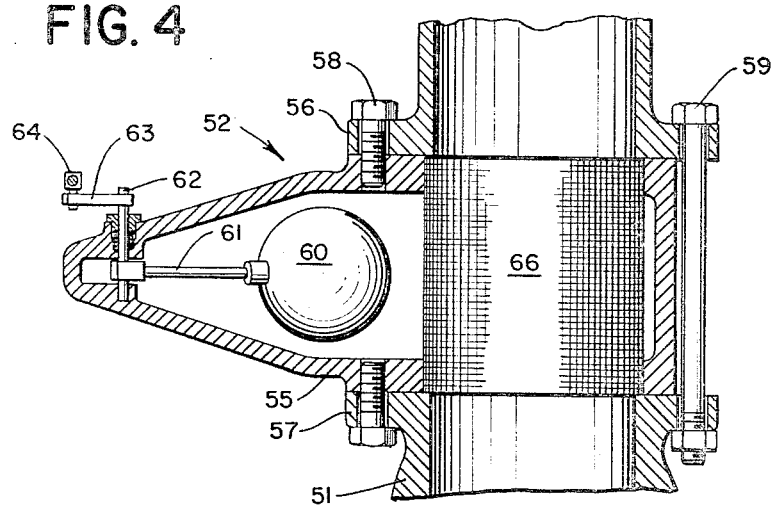
FIG. 4 is a partial section taken along line 4—4 of FIG. 3 on an enlarged scale.
Figure 5:
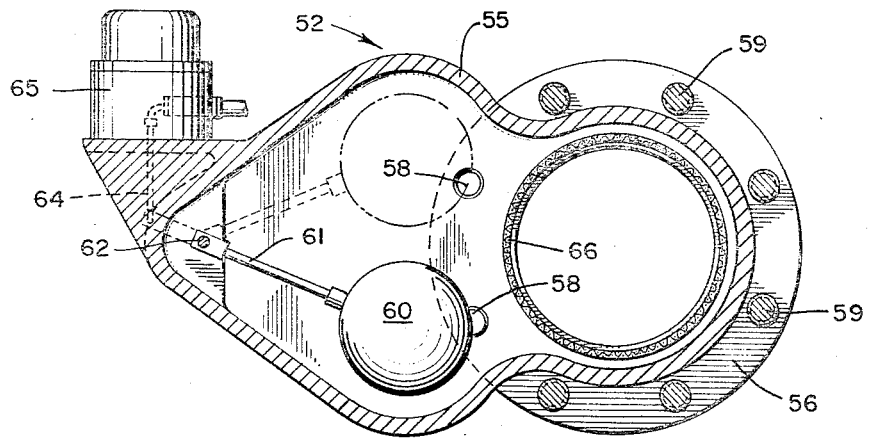
FIG. 5 is a partial section taken on line 5—5 of FIG. 3, also on an enlarged scale.

Referring now to FIGS. 3 to 5, an embodiment of the present invention is shown which utilizes a different form of pump, but operates on principles similar to those employed in the form just described.

In this form, a waste line or drain 40 delivers the waste liquid through an opening in the top 41 of a closed tank 42 for accumulation. Mounted on the top 41 is a centrifugal pump 43, the inlet 44 of which is connected to a pipe 45 extending downwardly to near the bottom of the tank. The pump base 44' is in water-tight relation to the tank top, to prevent escape of wastes when the tank is full.

It is a characteristic of centrifugal pumps that they must be primed before they will operate. Accordingly, the casing 46 of the pump is vented at 47, the vent line 48 being connected to the waste line 49, which line itself is vented to the atmosphere in usual practice. The discharge of the pump is connected to the line 50 through a check valve 51 and a float chamber 52. With this arrangement, the liquid can rise freely up the pipe 45 into the pump chamber displacing the air therein through the vent line.

In order to activate the pump when the level of the liquid reaches a sufficient height in the pump casing to prime it for operation, the float chamber 52 best shown in FIGS. 4 and 5 is provided.

It comprises a body 55 adapted to be secured between the pump discharge flange 56 and the flange 57 of the check valve 51, as by the bolts 58, 59. To one side a suitable enlargement, essentially triangular in cross section is provided, to form the float chamber proper. A float 60, secured to a float arm 61 which has a very short stroke, pivots with this arm about the axis of a shaft 62, which extends to the exterior of the chamber through a suitable stuffing box. The outer end of the shaft 62 carries in turn an arm 63, connected by suitable linkage 64 to a switch 65 which controls the pump motor. The parts are arranged to start the pump motor when the float is in upper position, and shut it off when the float is in its lower position. For the purpose of preventing fouling of the float, a screen 66 may be provided to define a through passage for the pump discharge while at the same time preventing solids from reaching the float chamber proper.

As it is desirable that the pump sealing means and bearings not be exposed to the waste liquid, the float and switch are adjusted to start the pump motor as soon as the surface of the liquid reaches the top inside of the impeller, or a little higher. The height is not, however, critical, except that it must be high enough to properly prime the pump.

As soon as the pump starts, it lifts the liquid up the pipe 45 and discharges it through the float chamber to the check valve and thence to the point of disposal. When the level of the fluid in the tank reaches the bottom of the pipe 45, pumping ceases, and the float chamber empties, partly, sufficiently to cause the float to fall and shut off the motor through switch 65. The mechanism is then ready to repeat the cycle.

It will be noted that in both of the forms shown, the operation of the device is controlled by the level of the liquid in a chamber connected to or part of the discharge line. A single float having a very short stroke, as illustrated, is the most convenient and simplest construction for so controlling the pump. It must be emhpasized, however, that other liquid level detecting means can be employed, such as a pressure switch operable by the head of liquid in the chamber or an appropriate part of the discharge line.

It is to be understood that there are various modifications possible in the shown embodiment of this invention, and that the description is by way of illustration and not of limitation, the invention being best apprehended by the appended claims.

What is claimed is:

1. In a pumping system, a closed tank adapted to receive a liquid therein, a conduit extending into the tank and having an opening near the bottom of said tank, a chamber disposed outside of said tank and connected to said conduit, said conduit communicating said chamber with the liquid in said tank at predetermined levels of said liquid, a float in said chamber, a pump, means operating said pump when actuated upon rise of said float and causing cessation of operation on fall of the float, said pump driving liquid up said conduit and through the float chamber, the arrangement being such that said operating means remain actuated until the liquid level falls below said opening of said conduit, screen means defining a passage into and out of the float chamber and defining a main path of flow with said conduit, said screen means isolating the float from the inlet and outlet of the chamber, a discharge conduit connected with the main path of flow above the float chamber, said pump driving liquid through the conduit, float chamber and discharge conduit upon operation.

2. The pumping system of claim 1 in which said screen means separates the float chamber into two volumes, one of which, occupied by the float, is separated from the inlet and outlet of the chamber, the other of said volumes constituting a portion of said main path.

3. A switch actuator for use with a pumping system including a reservoir, a pump connected to said reservoir for forcing the liquid in said reservoir into a main flow path when actuated, said actuator comprising a housing having walls, said housing comprising a flow through chamber and a liquid receiving chamber, said flow through chamber and said liquid receiving chamber being in communication with each other, a pair of openings in said walls permitting passage of liquid into and out of said flow through chamber, said flow through chamber constituting said main flow path for said liquid, means for detecting liquid level within said liquid receiving chamber, and control means responsive to the liquid level detecting means adapted to cause cessation of the flow of liquid to said flow through chamber upon fall of the liquid within said liquid receiving chamber below a predetermined level, and screen means separating the flow through chamber from the liquid receiving chamber, said flow through chamber at one end thereof being adapted to be connected to a discharge conduit and at the other end thereof to a suction conduit, and in which said liquid level detecting means comprises a float disposed in said liquid receiving chamber, arm means connecting said float over a relatively short path to said control means for actuating said control means upon liquid rising in said liquid receiving chamber above a predetermined level.

4. An actuator as claimed in claim 3, including a generally T shaped hollow body which at said one end thereof comprises a horizontal branch adapted to be connected to a source of liquid and adapted to be connected on the other horizontal branch to said discharge conduit, and at the other end thereof comprising a bottom branch adapted to be connected to said suction conduit extending into a closed tank to a point adjacent the bottom thereof, said control means being connected to said float means and adapted to activate said pump when the float means is in an upper position and cause cessation of operation of the pump when in a lower position.

5. The device of claim 4 in which said float chamber is below the run of the T.

6. A pumping system as claimed in claim 1, wherein said pump is a centrifugal pump mounted above the upper wall of the tank and having the inlet thereof connected into said main path of flow below said float chamber.

7. The pumping system as claimed in claim 1, wherein said pump is a compressor supplying air to said tank and forcing said liquid through said main flow path when actuated, said compressor permitting venting air therethrough from said tank when in rest position.

References Cited by the Examiner
UNITED STATES PATENTS

| | | | |
|---|---|---|---|
| 1,594,483 | 8/1926 | Yeomans | 103—26 |
| 1,817,196 | 8/1931 | Jennings | 137—209 |
| 2,017,345 | 10/1935 | Granberg | 103—3 |
| 2,212,562 | 8/1940 | Griffith | 137—209 |
| 2,222,595 | 11/1940 | Regester | 103—26 |
| 2,300,039 | 10/1942 | Yeomans et al. | 103—241 |
| 2,316,494 | 4/1943 | Tipton | 103—25 |
| 2,383,834 | 8/1945 | Yeomans | 103—241 |
| 2,660,360 | 11/1953 | Gricas et al. | 137—209 |
| 2,817,299 | 12/1957 | Weis | 103—241 |
| 2,955,173 | 10/1960 | Krauz | 103—26 |
| 2,963,980 | 12/1960 | White | 103—111 |
| 3,131,637 | 5/1964 | Jennings | 103—26 |
| 3,185,789 | 5/1965 | Grunther | 200—84 |

MARK NEWMAN, *Primary Examiner.*

SAMUEL LEVINE, *Examiner.*

W. L. FREEH, *Assistant Examiner.*